US008487947B2

(12) United States Patent
Benson et al.

(10) Patent No.: US 8,487,947 B2
(45) Date of Patent: Jul. 16, 2013

(54) VIDEO PROCESSING ARCHITECTURE HAVING REDUCED MEMORY REQUIREMENT

(75) Inventors: Richard Benson, London (GB); Peter Kroon, Green Brook, NJ (US); Nigel Henry Wood, Bracknell (GB)

(73) Assignee: Agere Systems Inc., Allentown, PA (US)

( * ) Notice: Subject to any disclaimer, the term of this patent is extended or adjusted under 35 U.S.C. 154(b) by 1665 days.

(21) Appl. No.: 11/536,177

(22) Filed: Sep. 28, 2006

(65) Prior Publication Data
US 2008/0079733 A1    Apr. 3, 2008

(51) Int. Cl.
G06F 15/167 (2006.01)
G06F 15/16 (2006.01)
G09G 5/36 (2006.01)

(52) U.S. Cl.
USPC .................. 345/541; 345/547; 345/502

(58) Field of Classification Search
USPC .......... 345/501, 502, 505, 530, 539, 541, 345/545, 547, 555; 718/105
See application file for complete search history.

(56) References Cited

U.S. PATENT DOCUMENTS

| 5,278,647 | A | * | 1/1994 | Hingorani et al. | 375/240.15 |
| 5,638,531 | A | | 6/1997 | Crump et al. | |
| 5,696,985 | A | | 12/1997 | Crump et al. | |
| 5,818,537 | A | * | 10/1998 | Enokida et al. | 348/441 |
| 5,936,616 | A | * | 8/1999 | Torborg et al. | 345/555 |
| 5,940,086 | A | * | 8/1999 | Rentschler et al. | 345/503 |
| 6,366,289 | B1 | * | 4/2002 | Johns | 345/543 |
| 6,529,249 | B2 | | 3/2003 | Hashemi | |
| 6,614,441 | B1 | * | 9/2003 | Jiang et al. | 345/539 |
| 6,753,878 | B1 | * | 6/2004 | Heirich et al. | 345/629 |
| 6,900,845 | B1 | | 5/2005 | Christopher et al. | |
| 6,959,348 | B1 | | 10/2005 | Chan et al. | |
| 7,697,165 | B2 | * | 4/2010 | Osaki et al. | 358/1.9 |
| 2002/0085638 | A1 | | 7/2002 | Morad et al. | |
| 2002/0131501 | A1 | | 9/2002 | Morad et al. | |
| 2004/0062308 | A1 | | 4/2004 | Kamosa | |
| 2004/0187165 | A1 | | 9/2004 | Kai et al. | |
| 2004/0240548 | A1 | | 12/2004 | Morad et al. | |
| 2005/0219422 | A1 | | 10/2005 | Dorojevets et al. | |
| 2005/0226337 | A1 | | 10/2005 | Dorojevets et al. | |
| 2007/0080971 | A1 | * | 4/2007 | Sung | 345/545 |

* cited by examiner

Primary Examiner — Joni Richer
(74) Attorney, Agent, or Firm — Otterstedt, Ellenbogen & Kammer, LLP (57) ABSTRACT

In a system comprising a plurality of processors and a memory shared by at least a subset of the processors, a method for processing video data includes the steps of: (a) a first one of the processors receiving a first video frame and storing the first video frame in the memory; (b) the first one of the processors receiving at least a second video frame, receipt of the second video frame initiating a release of the first video frame from the memory; (c) the first one of the processors sending the first and second video frames to a second one of the processors together for processing by the second one of the processors; (d) the second one of the processors generating an output video frame based at least on the first and second video frames; (e) storing the output video frame in the memory by overwriting an available memory location therein, the output video frame becoming a new first video frame; and (f) repeating steps (b) through (e) until all video frames to be processed have been received.

24 Claims, 3 Drawing Sheets

VIDEO PROCESSING ARCHITECTURE HAVING REDUCED MEMORY REQUIREMENT

FIELD OF THE INVENTION

The present invention relates generally to data processing, and more particularly relates to frame-based data processing.

BACKGROUND OF THE INVENTION

As the number of communication networks, types of client devices, and multimedia content formats increase, interoperability between different systems and networks is becoming of greater importance. For video applications, when pre-encoded video content needs to be distributed to users with different connections, the implementation is often difficult because the target transmission channel conditions are generally unknown when the video is originally encoded. Besides the problem of channel characteristics and capacities, different end devices used in modern communication also introduce certain problems. For example, most current handheld devices have only limited computing and display capabilities, which are typically not suitable for decoding and displaying high quality video. In this case, pre-coded high quality video content may need to be converted to a lower resolution format for displaying on handheld devices. Moreover, as the number of different video compression standards (e.g., H.261, H.263, H.264, MPEG-1, MPEG-2, MPEG-4) increases, there is a growing need for conversion between video content coded by different standards. Thus, devices such as gateways and servers must be developed to provide a seamless interaction between content creation and consumption. Transcoding of multimedia content is one known technique to facilitate such interaction.

Transcoding can be broadly defined as the conversion of one coded signal to another coded signal. In the specific context of video signals, video transcoding typically comprises the necessary operations for converting a compressed video stream from one format to another format for transmission over heterogeneous networks to various types of end devices. Video transcoding is typically performed in a video processor. High density processing of multiple video channels, for example, as in a video gateway or a video server, typically requires multiple instances of video processors (e.g., digital signal processors (DSPs)) and a shared network interface. The shared network interface is often managed by a network processor.

One disadvantage associated with video processing in general, however, is that video processors, particularly in a video gateway servicing multiple video channels, generally require a substantially large local memory for storing data generated by and/or used in conjunction with the video decoding operation, which can be costly. If video transcoding is performed, memory requirements can increase even further. Although memory pooling can be used with the local memory to reduce this memory overhead, it is significantly more difficult, and thus undesirable, to reconfigure system resources either during runtime or during setup.

Accordingly, there exists a need for improved video processing techniques which do not suffer from one or more of the problems exhibited by conventional video processing methodologies.

SUMMARY OF THE INVENTION

The present invention meets the above-noted need by providing, in illustrative embodiments thereof, techniques for advantageously reducing the amount of memory required in a frame-based data processing apparatus.

In accordance with one aspect of the invention, in a system comprising a plurality of processors and a memory shared by at least a subset of the processors, a method for processing video data includes the steps of: (a) a first one of the processors receiving a first video frame and storing the first video frame in the memory; (b) the first one of the processors receiving at least a second video frame, receipt of the second video frame initiating a release of the first video frame from the memory; (c) the first one of the processors sending the first and second video frames to a second one of the processors together for processing by the second one of the processors; (d) the second one of the processors generating an output video frame based at least on the first and second video frames; (e) storing the output video frame in the memory by overwriting an available memory location therein, the output video frame becoming a new first video frame; and (f) repeating steps (b) through (e) until all video frames to be processed have been received.

The method may further include the steps of: when a new second video frame is received by the first one of the processors before receiving the new first video frame from the second one of the processors, storing the new second video frame in the memory; and the first one of the processors receiving the new first video frame from the second one of the processors, a receipt of the new first video frame initiating a release of the new second video frame from the memory if the new second video frame arrived before receiving the new first video frame.

In accordance with another aspect of the invention, a system for processing framed-based video data includes a plurality of processors and a memory shared by at least a subset of the processors. A first one of the processors is operative: (i) to receive a first video frame and to store the first video frame in the memory; (ii) to receive at least a second video frame, receipt of the second video frame initiating a release of the first video frame from the memory; (iii) to send the first and at least second video frames to a second one of the processors together for processing by the second one of the processors. The second one of the processors is operative: (iv) to generate an output video frame based at least on the first and at least second video frames, the output video frame becoming a new first video frame; (v) to send the output video frame to the first one of the processors for storage in the memory by overwriting an available memory location therein, the output video frame becoming a new first video frame. Steps (i) through (v) are repeated until all video frames to be processed have been received.

In accordance with yet another aspect of the invention, an apparatus for use in a frame-based video processing system includes a memory adapted to be shared by at least a subset of video processors included in the video processing system, and at least one network processor coupled to the memory. The network processor is operative: (i) to receive a first video frame and to store the first video frame in the memory; (ii) to receive at least a second video frame, receipt of the second video frame initiating a release of the first video frame from the memory; (iii) to send the first and second video frames to given one of the video processors together for processing by the given video processor; (iv) to receive from the given video processor an output video frame generated by the given video processor; (v) to store the output video frame in the memory by overwriting an available memory location therein, the output video frame becoming a new first video frame; and (vi) to repeat steps (ii) through (v) until all video frames to be processed have been received.

In accordance with still another aspect of the invention, an apparatus for use in a frame-based video processing system includes at least one video processor adapted for connection to a network processor included in the video processing system. The video processor is operative: (i) to receive from the network processor a first video frame and at least a second video frame, the first video frame being stored in a memory coupled to the network processor, the memory being shared by a subset of video processors in the video processing system, where upon receipt of the at least second video frame, the network processor initiates a release of the first video frame from the memory; (ii) to generate an output video frame based at least on the first and second video frames; (iii) to send the output video frame to the network processor, the output video frame being stored in the memory by overwriting an available memory location therein, the output video frame becoming a new first video frame; and (iv) to repeat steps (i) through (iii) until all video frames to be processed have been received.

These and other features, objects and advantages of the present invention will become apparent from the following detailed description of illustrative embodiments thereof, which is to be read in connection with the accompanying drawings.

DETAILED DESCRIPTION OF THE INVENTION

The present invention will be described herein in the context of illustrative embodiments of a video processing apparatus and methods as may be employed, for example, in a video gateway or a video server application. It should be understood, however, that the present invention is not limited to the particular illustrative embodiments shown. Rather, the present invention provides techniques for advantageously reducing the amount of local memory required for processing video data in a multiple processor environment.

Figure 1:
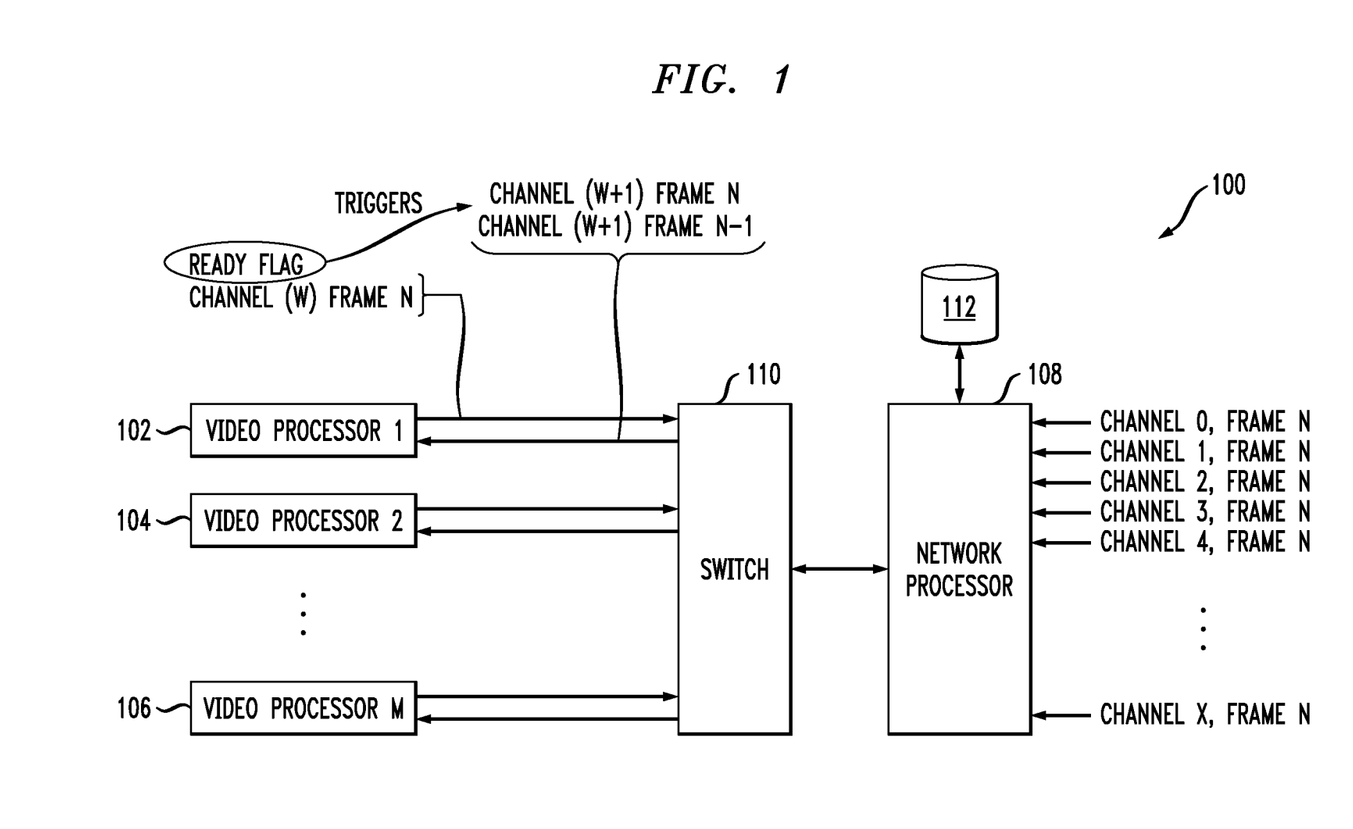
FIG. 1 is a block diagram depicting an exemplary video processing system in which techniques of the present invention are implemented, in accordance with an embodiment of the invention.

FIG. 1 is a block diagram depicting an exemplary video processing system 100 in which techniques of the present invention are implemented, in accordance with an embodiment of the invention. The video processing system 100 may, for example, be used for implementing a video gateway, video server, etc., which requires high density processing of multiple video channels. The video processing system 100 preferably includes a plurality of video processors, 102, 104 and 106, or alternative processing elements (e.g., digital signal processor, etc.), connected to a network processor 108, or alternative processor (e.g., central processing unit), by means of a switch 110, or alternative interface circuitry. The network processor 108 and switch 110, together, form a shared network interface for managing the flow of multimedia data between the plurality of video processors 102, 104, 106 and a communication network (not shown).

It is to be understood that the invention is not limited to any particular number of video processors employed in the video processing system 100. As a practical matter, the number of video processors used will depend primarily on the capabilities of the network processor 108 and/or on the number of client devices to be serviced by the system. Thus, as the number of client devices increases, the number of video processors employed should preferably increase accordingly. A client device may include, for example, any device capable of presenting multimedia content to a user, including, but not limited to, a video display, a personal digital assistant, etc. Each of the video processors 102, 104, 106 may service multiple client devices.

In many conventional video processing systems, each instance of a video processor includes a large local memory. This local memory, however, adds significant cost to the system, and thus such a video processing architecture is undesirable. The present invention, in illustrative embodiments thereof, exploits the fact that the video processor function typically requires access to only a limited amount of data at any one time, namely, those video frames needed to process (e.g., decode) a current video frame for a given channel. For most common video compression standards, such as, for example, Motion Pictures Expert Group 4 (MPEG-4), an encoded current video frame N (e.g., compressed video frame N) and a decoded video frame N−1 (e.g., decompressed video frame N−1) immediately preceding the current video frame are generally required for decoding the current video frame N. Other video compression formats may require maintaining more than just the previous video frame N−1. For example, an H.264 video compression standard requires the current video frame (e.g., compressed video frame N) and multiple previously decoded video frames (e.g., decompressed video frames N−1, N−2, N−3 and N−4) in order to decode the compressed current video frame N. The number of previously decoded video frames employed typically depends on the encoding level and is a decision of the encoder. In any case, each of the video processors 102, 104 and 106 should ideally require minimal or no external memory.

Rather than utilizing a large external local memory for each of the video processors 102, 104, 106, the video processing system 100 includes a memory 112 connected to the network processor 108. Memory 112 may comprise, for example, double-data-rate (DDR) synchronous dynamic random access memory (SDRAM), fast cycle random access memory (FCRAM), reduced latency dynamic random access memory (RLDRAM), etc., although the invention is not limited to any specific type of memory employed. Memory 112 is preferably shared by the video processors 102, 104, 106 and is used to at least temporarily store one or more video frames corresponding to each channel (e.g., Channel 0 through Channel X) received by the network processor. This arrangement advantageously reduces the amount of local distributed memory required by the video processing system 100, and thereby reduces the overall cost of the system.

In accordance with an exemplary embodiment of the invention, network processor 108 may be implemented using a PayloadPlus® (a registered trademark of Agere Systems Inc.) network processor in the APP300, APP500 or APP600 product families, commercially available from Agere Systems Inc. of Allentown, Pa., U.S.A. One or more of the video processors 102, 104, 106 may be implemented using a StarPro™ (a trademark of Agere Systems Inc.) 25xx family of DSPs, also commercially available from Agere Systems Inc., where "xx" in the part number indicates the number of processing cores within the DSP (e.g., 03, 12). Switch 110 may comprise, for example, a Gigabit Ethernet (GbE) switch, although alternative interface circuitry is similarly contemplated by the invention.

When receiving streaming video content over a given channel from the network, or other multimedia source, the first video frame received by the network processor 108 typically includes all of the information necessary to accurately reconstruct the original transmitted scene. In accordance with most video compression standards, subsequent video frames received by the network processor 108 are generally encoded (e.g., compressed) and include only difference information representing data which has changed between the previous video frame and the current video frame. This reduces the amount of memory bandwidth required for transmitting the video stream. Thus, the current video frame N may be decoded by updating the changed portions of the previous video frame N−1, based on the compressed current video frame N.

Assume a previous decoded (e.g. decompressed) video frame N−1 corresponding to channel W is stored in memory 112, where W is an integer greater than or equal to zero representing one of the channels received by the network processor 108. When a compressed current video frame N for channel W is received by the network processor 108, this triggers the release of decompressed previous video frame N−1 for channel W from memory 112, and both the decompressed previous video frame N−1 and the compressed current video frame N for channel W are sent to an available video processor (e.g., video processor 102) for processing. Once the pair of video frames N and N−1 are sent to the available video processor 102, the memory space previously occupied by decompressed video frame N−1 becomes available for storage of another video frame received by the network processor (e.g., by overwriting by the available memory space), thereby beneficially conserving valuable memory resources. The network processor 108 is preferably adapted to keep track of available memory space in memory 112 as video frames are released and sent to the video processors for subsequent processing.

Video processor 102 generates an output video frame based at least on the decompressed previous video frame N−1 and the compressed current video frame N for channel W sent by the network processor 108. The output video frame is a decompressed current video frame N for channel W. This decompressed current video frame N is then sent back to the network processor 108 for storage in memory 112, preferably by overwriting one of the available memory locations. This output video frame becomes a new decompressed previous video frame N−1 for channel W. At substantially the same time that the output video frame is sent to the network processor 108, the output video frame may be sent to a destination device serviced by video processor 102. The output frame may be sent to the destination device directly by the video processor 102. Alternatively, the responsibility for forwarding the output video frame to the destination device may be off-loaded to the network processor. Specifically, the network processor 108, upon receiving the output video frame from the video processor 102, may be configured to duplicate the output video frame, store a copy of the output video frame in memory 112 and send a copy of the output video frame to the destination device. In this manner, the video processor 102 is free to perform other processing tasks, such as decoding and/or transcoding another video frame.

As stated above, the output video frame generated by the video processor 102 is sent to the network processor 108 and stored in memory 112 as a new decompressed previous video frame N−1 for a given channel. In most instances, the network processor 108 will receive and store the previous video frame N−1 before a new compressed current video frame N for that channel arrives from the multimedia source. Thus, the arrival of the new current video frame N can be used as a trigger to release the previous video frame N−1 from memory 112 and to send both the previous and current video frames to an available video processor for decoding the current video frame.

There may be instances, however, when the new current video frame N arrives at the network processor before the new previous video frame N−1 is generated by the video processor and sent to the network processor 108. In this instance, the network processor 108 cannot use the arrival of the new current video frame N from the multimedia source as a trigger to release the previous video frame from memory since this stored video frame is really two frames prior to the new current frame (e.g., previous video frame N−2). At this point, the network processor does not have all video frames necessary for the video processor to decode the current video frame. Therefore, the network processor 108 is preferably operative to store the new compressed current video frame N in memory 112 until the new previous video frame N−1 is received from the video processor 102. The receipt of the new previous video frame N−1 from the video processor is then used as a trigger for releasing the new current video frame N from memory 112 and for sending both the current and previous video frames to an available video processor.

The video processor 102 sending the output video frame, namely, decompressed current video frame N, for channel W, to the network processor 108, preferably serves as a trigger event, indicating to the network processor that the video processor is available to process another two or more video frames. Effectively, the sending of the output video frame from the video processor 102 to the network processor 108 is tantamount to setting a "ready flag" in the video processor. Thus, once the output video frame sent by video processor 102 is received by the network processor 108, the next pair of video frames, namely, compressed current video frame N and decompressed previous video frame N−1 corresponding to another channel W+1, is sent to the video processor for processing. While the new pair of video frames for channel W+1 sent to the video processor 102 most likely corresponds to a different channel than the output video frame for channel W previously generated by the video processor, it is certainly feasible that channel W and channel W+1 may, in fact, correspond to the same channel. The network processor 108 is preferably responsible for scheduling which video processor to send a new pair of video frames, based, for example, on availability of the video processors 102, 104, 106, the time that a new compressed current video frame N is received from the multimedia source, etc.

In some video processing applications, it may be desirable to configure the network processor 108 and/or switch 110 so as to utilize a certain video processor to handle a dedicated subset of channels. For instance, video processor 102 may be assigned channels 0 through 9, video processor 104 may be assigned channels 10 through 19, and so on. This would relieve the scheduling burden on the network processor. However, this may not result in the most efficient processing scheme, since a given video processor may not have completed processing a current pair of video frames before a new pair of video frames corresponding to one of the channels assigned to the given video processor is available for processing. Therefore, it is preferable that the network processor 108 be adapted to allocate, based on video processor availability, which one of the video processors to send an available pair of video frames for processing. Most network processors are well-suited to handle such allocation.

Figure 2:
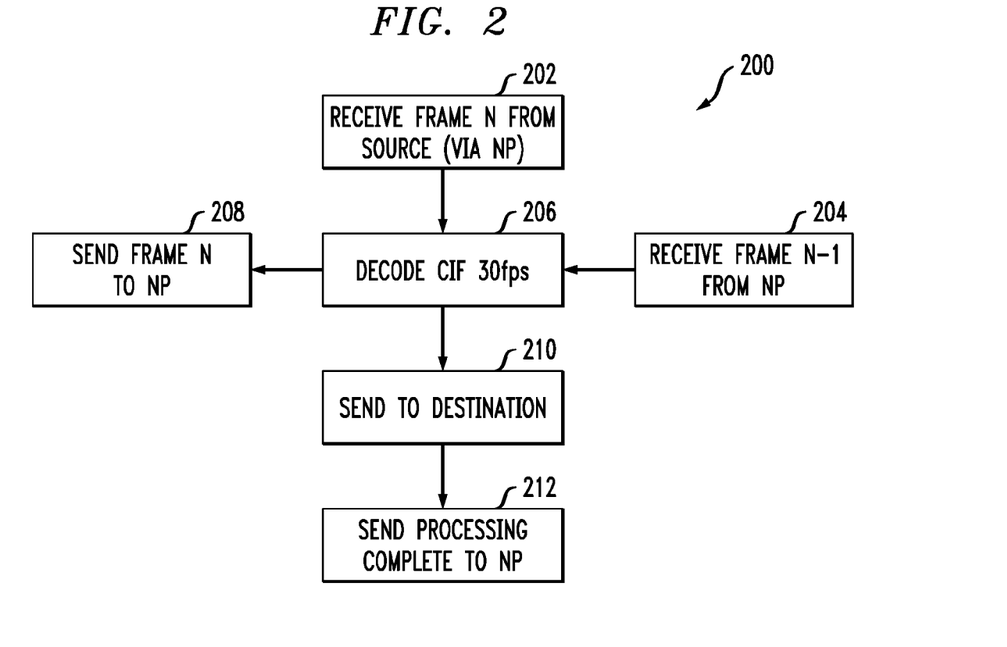
FIG. 2 is a signal flow diagram depicting an exemplary methodology for processing video frames using the illustrative video processing system shown in FIG. 1, in accordance with an embodiment of the present invention.

FIG. 2 is a signal flow diagram depicting an exemplary methodology 200 for processing video frames using the illustrative video processing system 100 shown in FIG. 1, in accordance with an embodiment of the invention. As apparent from the figure, processing methodology 200, which is performed in a video processor, initiates upon receipt of a compressed current video frame N from a multimedia source via a network processor (NP) in step 202 and upon receipt of a decompressed previous video frame N−1 from memory associated with the network processor in step 204. As stated above, the network processor preferably sends both frames substantially simultaneously to the video processor for subsequent processing. The video processor then decodes the current video frame N, which may be in common intermediate format (CIF) at 30 frames per second (fps), at step 206 based at least on the decompressed previous video frame N−1 and on the compressed current video frame N to generate an output video frame which is a decompressed current video frame N. The decompressed current video frame N is then sent to the network processor at step 208. The decompressed current video frame N is also sent to a destination device at step 210.

The video processor may send a "processing complete" message to the network processor at step 212 after sending the output video frame to the destination device, thereby signaling that the video processor is available to process another pair of video frames. The methodology 200 completes at this point. Alternatively, the act of sending the output video frame to the network processor may be considered a trigger event which initiates the network processor to send another plurality (e.g., pair) of video frames to the video processor. This would effectively eliminate the need to generate and send a separate "processing complete" acknowledgment by the video processor.

Figure 3:
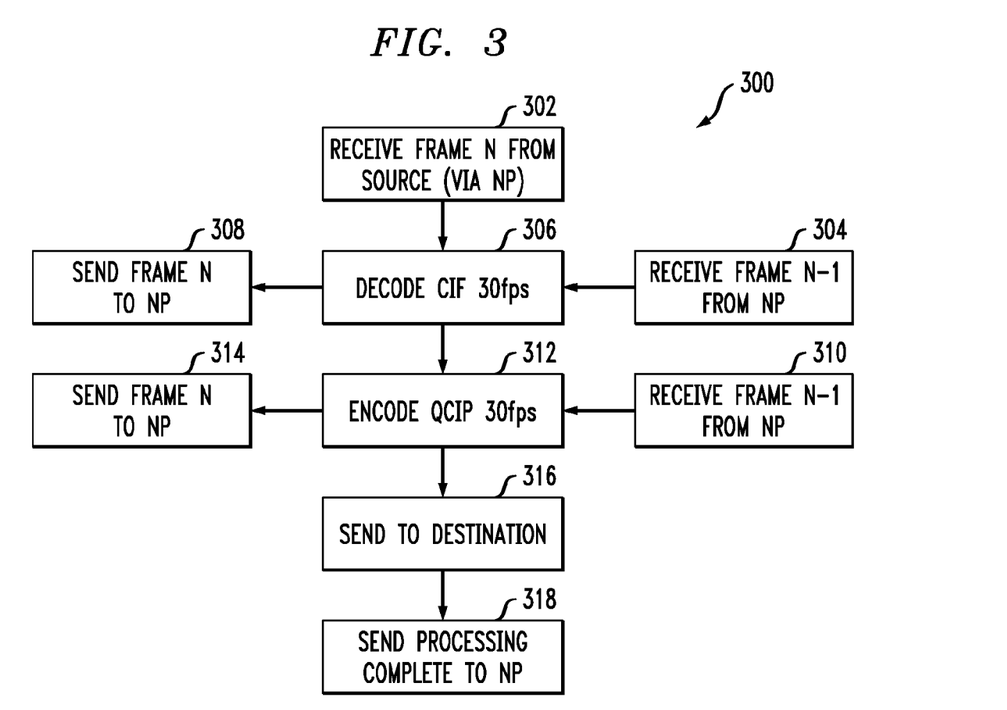
FIG. 3 is a signal flow diagram depicting an exemplary methodology for processing video frames using the illustrative video processing system shown in FIG. 1, in accordance with another aspect of the present invention.

With reference now to FIG. 3, there is shown a signal flow diagram depicting an exemplary methodology 300 for processing video frames using the illustrative video processing system 100 shown in FIG. 1, in accordance with another aspect of the invention. The processing methodology 300, which is performed in a video processor, beneficially adds a video transcoding feature to the methodology 200 shown in FIG. 2. As apparent from the figure, methodology 300 begins by receiving a compressed current video frame N from a multimedia source via a network processor (NP) in step 302, and receiving a decompressed previous video frame N−1 from memory associated with the network processor in step 304. As stated above, the network processor sends both frames substantially simultaneously to the video processor for subsequent processing. The video processor then decodes the current video frame N, which may be in CIF at 30 fps, at step 306 based at least on the decompressed previous video frame N−1 and on the compressed current video frame N to generate an output video frame which is a decompressed current video frame N. The decompressed current video frame N may then be sent to the network processor at step 308 where it is stored by overwriting one of the available memory locations.

As part of a transcoding feature of the video processor, the video processor receives the previous video frame N−1 from the network processor at step 310 and encodes the current video frame N in a different format at step 312 based at least on the received previous video frame N−1 and the decompressed current video frame N generated at step 306. Typically, transcoding not only changes the format but also changes the number of frames per second (e.g., from 30 fps to 15 fps), as part of a rescaling function, and/or changes the frame size (e.g., from CIF to quarter CIF (QCIF)), as part of a resampling function. Rescaling and/or resampling functions may be performed by the video encoder itself or, alternatively, by other circuitry external to the video encoder. The format of the encoded current frame N preferably matches that of a destination device, which may be, for example, QCIF at 30 fps. The encoded current video frame N is sent to the network processor at step 314. The encoded current video frame N is also sent to the destination device at step 316.

The video processor may send a "processing complete" message, or an alternative indicator, to the network processor at step 318 after sending the encoded current video frame N to the destination device, thereby signaling that the video processor is available to process another pair of video frames. The methodology 300 completes at this point. Alternatively, the act of sending the encoded current video frame N to the network processor may be considered a trigger event which initiates the network processor to send another pair of video frames to the video processor.

Figure 4:
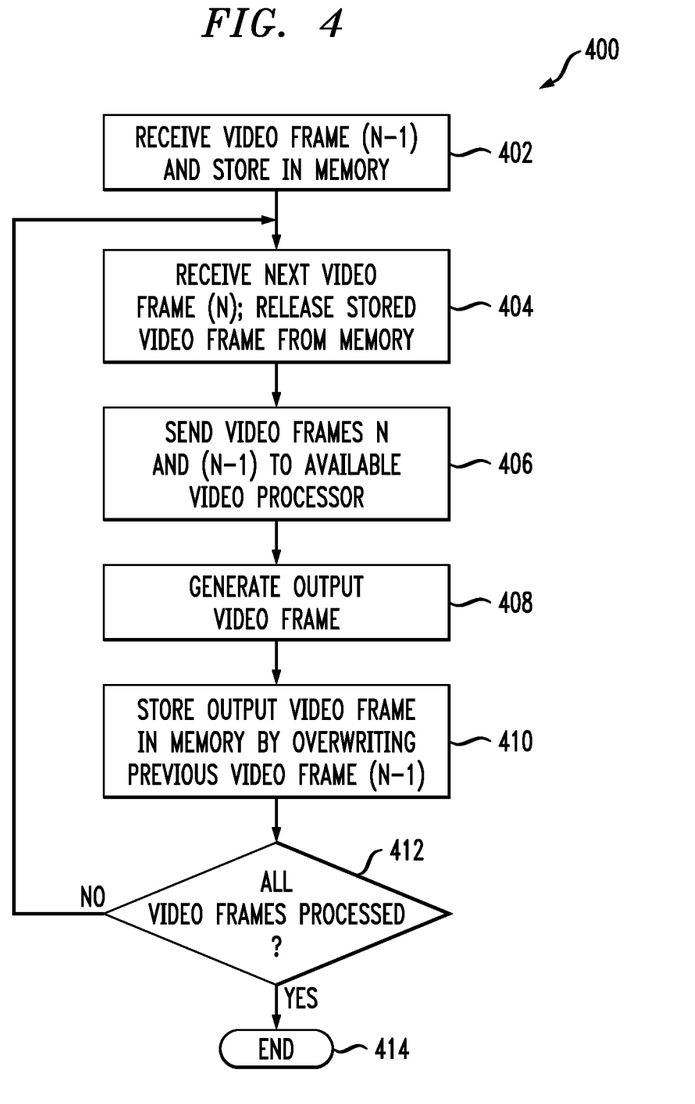
FIG. 4 is a logical flow diagram depicting an exemplary video processing methodology, in accordance with an embodiment of the present invention.

FIG. 4 is a logical flow diagram depicting an exemplary processing method 400, in accordance with an embodiment of the invention. The method 400 may be performed by the illustrative video processing system 100 shown in FIG. 1 for processing video frames received from a multimedia source, such as, for example, via a network. As apparent from the figure, at step 402 a decoded previous video frame N−1 corresponding to a given channel is received by the network processor and stored in memory associated with the network processor. An encoded (e.g., compressed) current video frame N for the given channel, which is immediately subsequent in time to the previous video frame N−1, is then received at step 404. The receipt of current video frame N triggers the release of previous video frame N−1 from memory, and both the previous and current video frames are sent to an available video processor at step 406.

For applications which require more than just one previous video frame N−1 (e.g., the previous two video frames, N−1 and N−2), step 402 may be modified slightly such that the network processor is operative to store all previous video frames in memory that are required to decode the current video frame N. Once all required frames are received by the network processor, the last video frame received (e.g., the current video frame N) effectively triggers the release of the previous video frames from memory, and all previous and current video frames corresponding to that channel that are necessary to decode the current video frame are then sent to the available video processor at step 406 as stated above.

Upon receiving the current video frame and at least one previous video frame from the network processor, the video processor generates an output video frame, which is preferably a decompressed current video frame N, at step 408. At step 410, the output video frame is then sent to the network processor where it is stored, such as by overwriting the previous video frame N−1, or some other available memory location (e.g., previously occupied by a stored video frame which has been released). At step 412, the method 400 checks to see whether or not all video frames to be processed have been received. If not all video frames have been received, the method continues at step 404. In this instance, the current video frame N, which was stored in memory at step 410, effectively becomes the new previous video frame N−1 for a new current video frame N received by the network processor at step 404. The process then continues as described above. If there are no more video frames to be processed, the method 400 ends at step 414.

In many standard video coding methodologies, a video frame is divided into macroblocks (e.g., 16×16 pixel blocks) and it is generally first determined how each macroblock has moved between frames. A motion vector defines any motion of the macroblock that occurs between frames and is used to construct a predicted frame. A process often referred to as motion estimation is typically performed in the video encoder to determine the best motion vector value for each macroblock. This predicted frame, which is a previously decoded frame adjusted by the motion vectors, is compared to an actual input frame. Any information remaining as a result of the comparison that is new is called the residual and is used to construct residual frames.

There are generally three main types of encoded frames in such standard video coding, namely, intra (non-predicted) frames (I-frames), forward predicted frames (P-frames), and bidirectional predicted frames (B-frames). I-frames are typically encoded as independent frames with no reference to past or future frames. These frames essentially contain all the information necessary to reconstruct the original picture and can be used to predict other frames. P-frames are encoded relative to one or more previous frames, while B-frames are encoded relative to previous and/or future frames.

Although illustrative embodiments of the invention described herein assume, for ease of explanation, that there is one I-frame followed by P-frames, it is to be understood that in typical video encoding schemes there is often at least one I-frame every second to facilitate fast searching and also reduce error propagation in case of transmission errors. Moreover, good video encoders will generally insert I-frames when they detect that prediction would not be effective, such as, for example, in the case of scene changes. The techniques of the present invention may be similarly employed with such video coding schemes to reduce the amount of local memory required for processing video data, as will become apparent to those skilled in the art.

At least a portion of the apparatus and methodologies of the present invention may be implemented in one or more integrated circuits. In forming integrated circuits, die are typically fabricated in a repeated pattern on a surface of a semiconductor wafer. Each of the die includes a device described herein, and may include other structures or circuits. Individual die are cut or diced from the wafer, then packaged as integrated circuits. One skilled in the art would know how to dice wafers and package die to produce integrated circuits. Integrated circuits so manufactured are considered part of this invention.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. In a system comprising a plurality of processors and a memory shared by at least a subset of the processors, a method for processing video data, the method comprising the steps of:
   (a) a first one of the processors receiving a first video frame and storing the first video frame in the memory, the first video frame being a decompressed video frame;
   (b) the first one of the processors receiving at least a second video frame, the second video frame being a compressed video frame, receipt of the second video frame initiating a release of the first video frame from the memory, a memory location within the memory associated with the first video frame thereby becoming available for storing a subsequent video frame;
   (c) the first one of the processors sending the first and second video frames to a second one of the processors together for processing by the second one of the processors;
   (d) the second one of the processors generating an output video frame based at least on the first and second video frames, the output video frame being a decompressed video frame;
   (e) storing the output video frame in the memory by overwriting an available memory location therein, the output video frame becoming a new first video frame; and
   (f) repeating steps (b) through (e) until all video frames to be processed have been received.

2. The method of claim 1, further comprising the steps of:
   determining which of the plurality of processors is available to receive the first and at least second video frames for subsequent processing; and
   sending the first and at least second video frames to the available processor for processing in accordance with steps (a) through (f).

3. The method of claim 2, wherein upon storing the output video frame in the memory, the available processor is operative to indicate that it is available to receive a subsequent plurality of video frames.

4. The method of claim 2, wherein upon receiving the first and at least second video frames, the available video processor is operative to indicate that it is unavailable to receive further video frames for processing.

5. The method of claim 1, wherein the first one of the processors comprises a network processor.

6. The method of claim 1, wherein the second one of the processors comprises at least one of a video processor and a digital signal processor.

7. The method of claim 1, wherein the at least one of the video frames is received from a data network.

8. The method of claim 1, wherein the first video frame temporally precedes the second video frame.

9. The method of claim 1, wherein the available memory location is a memory location that previously stored the first video frame that has been released.

10. The method of claim 1, further comprising the step of at least one of the first and second one of the processors sending the output video frame to a destination device.

11. The method of claim 1, further comprising the step of:
   during at least a portion of time that the second one of the processors is processing the first and at least second video frames, the first one of the processors sending a subsequent plurality of video frames to a third one of the processors for processing.

12. The method of claim 1, further comprising the steps of:
   the second one of the processors transcoding the output video frame; and
   sending the transcoded output video frame to the first one of the processors.

13. The method of claim 12, wherein the step of transcoding comprises at least one of:
   encoding the output video frame in a format that is different than a format of the first and second video frames;
   encoding the output video frame such that a number of frames per second of an output video stream is different than a number of frames per second of an input video stream comprising the first and second video frames; and encoding the output video frame to have a frame size that is different than a frame size of the first and second video frames.

14. The method of claim 1, further comprising the step of sending an indicator to the first one of the processors indicating that the second one of the processors has completed processing the first and at least second video frames.

15. The method of claim 1, further comprising the steps of:
when a new second video frame is received by the first one of the processors before receiving the new first video frame from the second one of the processors, storing the new second video frame in the memory; and the first one of the processors receiving the new first video frame from the second one of the processors, a receipt of the new first video frame initiating a release of the new second video frame from the memory, a memory location within the memory associated with the new second video frame thereby becoming available for storing a subsequent video frame, if the new second video frame arrived before receiving the new first video frame.

16. In a system comprising a plurality of processors and a memory shared by at least a subset of the processors, a method for processing video data, the method comprising the steps of:
(a) a first one of the processors receiving a first video frame and storing the first video frame in the memory, the first video frame being a decompressed video frame;
(b) the first one of the processors receiving at least a second video frame, the second video frame being a compressed video frame, receipt of the second video frame initiating a release of the first video frame from the memory, a memory location within the memory associated with the first video frame thereby becoming available for storing a subsequent video frame;
(c) sending the first and second video frames to a second one of the processors together for processing by the second one of the processors;
(d) the second one of the processors generating an output video frame based at least on the first and at least second video frames, the output video frame being a decompressed video frame, the output video frame becoming a new first video frame;
(e) when a new second video frame is received by the first one of the processors before receiving the new first video frame from the second one of the processors, storing the new second video frame in the memory;
(f) the first one of the processors receiving the new first video frame from the second one of the processors, a receipt of the new first video frame initiating a release of the new second video frame from the memory if the new second video frame arrived before receiving the new first video frame, a memory location within the memory associated with the new second video frame thereby becoming available for storing a subsequent video frame;
(g) storing the new first video frame in the memory by overwriting an available memory location therein; and
(h) repeating steps (c) through (g) until all video frames to be processed have been received.

17. The method of claim 16, further comprising the step of at least one of the first and second one of the processors sending the output video frame to a destination device.

18. A system for processing framed-based video data, the system comprising:
a plurality of processors; and
a memory shared by at least a subset of the processors;
wherein:
a first one of the processors is operative: (i) to receive a first video frame and to store the first video frame in the memory, the first video frame being a decompressed video frame; (ii) to receive at least a second video frame, the second video frame being a compressed video frame, receipt of the second video frame initiating a release of the first video frame from the memory, a memory location within the memory associated with the first video frame thereby becoming available for storing a subsequent video frame; and (iii) to send the first and at least second video frames to a second one of the processors together for processing by the second one of the processors;
the second one of the processors is operative: (iv) to generate an output video frame based at least on the first and at least second video frames, the output video frame being a decompressed video frame, the output video frame becoming a new first video frame; and (v) to send the output video frame to the first one of the processors for storage in the memory by overwriting an available memory location therein, the output video frame becoming a new first video frame; and
steps (i) through (v) are repeated until all video frames to be processed have been received.

19. The system of claim 18, further comprising interface circuitry coupled between the first one of the processors and a second subset of the processors, the first one of the processors and the second subset of the processors being mutually exclusive relative to one another, the interface circuitry being operative to control a flow of data between the first one of the processors and the second subset of the processors.

20. The system of claim 18, wherein the first one of the processors comprises a network processor.

21. The system of claim 18, wherein the second one of the processors comprises at least one of a video processor and a digital signal processor.

22. The system of claim 18, wherein the first one of the processors is further operative: when a new second video frame is received by the first one of the processors before receiving the new first video frame from the second one of the processors, to store the new second video frame in the memory; and to receive the new first video frame from the second one of the processors, a receipt of the new first video frame initiating a release of the new second video frame from the memory, a memory location within the memory associated with the new second video frame thereby becoming available for storing a subsequent video frame, if the new second video frame arrived before receiving the new first video frame.

23. An apparatus for use in a frame-based video processing system, the apparatus comprising:
a memory adapted to be shared by at least a subset of video processors included in the video processing system; and
at least one network processor coupled to the memory, the network processor being operative: (i) to receive a first video frame and to store the first video frame in the memory, the first video frame being a decompressed video frame; (ii) to receive at least a second video frame, the second video frame being a compressed video frame, receipt of the second video frame initiating a release of the first video frame from the memory, a memory location within the memory associated with the first video frame thereby becoming available for storing a subsequent video frame; (iii) to send the first and second video frames to given one of the video processors together for processing by the given video processor; (iv) to receive from the given video processor an output video frame generated by the given video processor, the output video frame being a decompressed video frame; (v) to store the output video frame in the memory by overwriting an available memory location therein, the output video frame becoming a new first video frame; and (vi) to repeat steps (ii) through (v) until all video frames to be processed have been received.

24. An apparatus for use in a frame-based video processing system, the apparatus comprising:

at least one video processor adapted for connection to a network processor included in the video processing system, the at least one video processor being operative: (i) to receive from the network processor a first video frame and at least a second video frame, the first video frame being a decompressed video frame and the second video frame being a compressed video frame, the first video frame being stored in a memory coupled to the network processor, the memory being shared by a subset of video processors in the video processing system, where upon receipt of the at least second video frame, the network processor initiates a release of the first video frame from the memory, a memory location within the memory associated with the first video frame thereby becoming available for storing a subsequent video frame; (ii) to generate an output video frame based at least on the first and second video frames, the output video frame being a decompressed video frame; (iii) to send the output video frame to the network processor, the output video frame being stored in the memory by overwriting an available memory location therein, the output video frame becoming a new first video frame; and (iv) to repeat steps (i) through (iii) until all video frames to be processed have been received.

* * * * *